United States Patent
Rajan et al.

(10) Patent No.: US 10,846,819 B2
(45) Date of Patent: Nov. 24, 2020

(54) METHOD AND APPARATUS TO INFER STRUCTURAL STRESSES WITH VISUAL IMAGE AND VIDEO DATA

(71) Applicant: Southern Methodist University, Dallas, TX (US)

(72) Inventors: Dinesh Rajan, Dallas, TX (US); Brett Story, Rockwall, TX (US); Joseph Camp, Dallas, TX (US)

(73) Assignee: Southern Methodist University, Dallas, TX (US)

( * ) Notice: Subject to any disclaimer, the term of this patent is extended or adjusted under 35 U.S.C. 154(b) by 168 days.

(21) Appl. No.: 15/951,632

(22) Filed: Apr. 12, 2018

(65) Prior Publication Data

US 2018/0300849 A1    Oct. 18, 2018

Related U.S. Application Data

(60) Provisional application No. 62/484,628, filed on Apr. 12, 2017.

(51) Int. Cl.
| | |
|---|---|
| G06K 9/00 | (2006.01) |
| G06K 9/64 | (2006.01) |
| G06K 9/32 | (2006.01) |
| H04N 7/18 | (2006.01) |
| G06F 11/00 | (2006.01) |
| G06T 3/00 | (2006.01) |

(Continued)

(52) U.S. Cl.
CPC ........ *G06T 3/0075* (2013.01); *G06K 9/00637* (2013.01); *G06K 9/00711* (2013.01); *G06K 9/00771* (2013.01); *G06K 9/6206* (2013.01); *G06T 7/001* (2013.01); *G06T 7/174* (2017.01); *G06T 7/246* (2017.01); *G06T 7/30* (2017.01); *G06T 7/33* (2017.01); *G06T 2207/10016* (2013.01); *G06T 2207/30236* (2013.01)

(58) Field of Classification Search
USPC ............... 382/276, 104, 160, 141, 278, 294; 348/143; 702/188
See application file for complete search history.

(56) References Cited

U.S. PATENT DOCUMENTS

| | | | |
|---|---|---|---|
| 6,928,881 B2 | 8/2005 | Brennan | |
| 7,620,209 B2 * | 11/2009 | Stevick | ............... A61B 5/0064 382/106 |

(Continued)

FOREIGN PATENT DOCUMENTS

WO    2014075140 A1    5/2014

*Primary Examiner* — Kathleen Y Dulaney

(74) *Attorney, Agent, or Firm* — Edwin S. Flores; Chalker Flores, LLP

(57) ABSTRACT

The present invention includes an apparatus and method for determining time-varying stress experienced by a structure comprising: obtaining images that include the structure; segmenting the second and any subsequent images to include the "static" portions that are identified from the first image; computing with a processor the affine transformations between the first and second, and optionally subsequent images, sequence of images; estimating a deformation (i.e. translation and rotation) undergone by the structure; and converting the deformation to estimate the structural stress by using one or more scaling functions) to generate the time-varying stress experienced by the structure.

22 Claims, 2 Drawing Sheets

(51) Int. Cl.
*G06T 7/174* (2017.01)
*G06T 7/30* (2017.01)
*G06T 7/00* (2017.01)
*G06K 9/62* (2006.01)
*G06T 7/246* (2017.01)
*G06T 7/33* (2017.01)

(56) References Cited

U.S. PATENT DOCUMENTS

| | | | |
|---|---|---|---|
| 7,734,081 B2 * | 6/2010 | Hwang | B24B 17/04 382/141 |
| 8,411,930 B2 * | 4/2013 | Ridley | E02F 9/2808 382/152 |
| 2004/0081332 A1 * | 4/2004 | Tuttle | G06K 9/00442 382/100 |
| 2010/0156632 A1 * | 6/2010 | Hyland | G08B 25/009 340/540 |
| 2010/0226524 A1 * | 9/2010 | Shakespeare | G01N 21/958 382/100 |
| 2011/0308638 A1 * | 12/2011 | Hyland | G01D 4/004 137/299 |
| 2012/0020573 A1 * | 1/2012 | Kacenjar | G06T 7/337 382/218 |
| 2012/0033851 A1 * | 2/2012 | Chen | G06T 7/0002 382/100 |
| 2013/0083192 A1 * | 4/2013 | Strine | H04N 5/23267 348/143 |
| 2014/0185884 A1 * | 7/2014 | Ma | G06K 9/00657 382/110 |
| 2014/0334689 A1 * | 11/2014 | Butler | G06T 7/001 382/108 |
| 2014/0374933 A1 * | 12/2014 | Flitsch | B33Y 10/00 264/36.1 |
| 2016/0356001 A1 * | 12/2016 | Shimada | G06K 9/00798 |
| 2016/0356002 A1 * | 12/2016 | Tani | E01C 23/07 |
| 2017/0243339 A1 * | 8/2017 | Yamamoto | B25J 9/0084 |
| 2018/0005407 A1 * | 1/2018 | Browning | B60W 30/095 |
| 2018/0060986 A1 * | 3/2018 | Suzuki | G08G 1/0969 |
| 2018/0099761 A1 * | 4/2018 | Griffiths | G06T 7/292 |
| 2018/0106609 A1 * | 4/2018 | Imai | G01B 11/16 |
| 2018/0276810 A1 * | 9/2018 | Wang | G01M 5/0033 |

* cited by examiner

METHOD AND APPARATUS TO INFER STRUCTURAL STRESSES WITH VISUAL IMAGE AND VIDEO DATA

CROSS-REFERENCE TO RELATED APPLICATIONS

This application is a non-provisional patent application of and claims priority to U.S. provisional patent application Ser. No. 62/484,628 filed on Apr. 12, 2017 and entitled "Method and Apparatus to Infer Structural Stresses with Visual Image and Video Data", the contents of which are hereby incorporated by reference in their entirety.

STATEMENT OF FEDERALLY FUNDED RESEARCH

None.

TECHNICAL FIELD OF THE INVENTION

The present invention relates in general to the field of detecting structural stress, and more particularly, to a novel apparatus and method for determining structural stress using images and video data.

BACKGROUND OF THE INVENTION

Without limiting the scope of the invention, its background is described in connection with structural monitoring systems.

One such invention is taught in U.S. Pat. No. 6,928,881, issued to Brennan and entitled "Method and apparatus for monitoring structural fatigue and use." Briefly, this inventor teaches an electronic stress monitoring device arranged to detect and record measurements of stress experienced by a structure to which the stress history unit is attached, with the measurement and recordal of stress occurring at substantially the same location. The stress monitoring unit is arranged to process the detected readings of stress to determine when significant structural events are occurring within the structure to which it is attached. Data indicative of these events are recorded within the stress monitoring device. Periodically data recorded within the stress monitoring device is obtained by data reader and then transmitted to a computer for subsequent analysis.

Another such invention is taught in International Patent Publication No. WO 2014/075140 A1, filed by Spenser and entitled "Monitoring system". Briefly, this applicant teaches a system for monitoring a utility pole structure that is subject to wind load, including: means to determine the wind load applied to the structure; a monitoring device to monitor a response of the structure to the wind load; a data storage device to record the response; and a processor to compare the response with historic response data, in order to provide structural condition information.

SUMMARY OF THE INVENTION

In one embodiment, the present invention includes a method for determining time-varying stress experienced by a structure comprising: (a) obtaining a first frame of a sequence of images that includes the structure; (b) identifying portions of the image that are static; (c) obtaining a second and subsequent images that include the structure; (d) segmenting the second and any subsequent images to include the "static" portions that are identified from the first image; (e) computing with a processor the affine transformations between the first and second, and optionally subsequent images, sequence of images; (f) estimating a deformation (i.e. translation and rotation) undergone by the structure; (g) converting the deformation to estimate the structural stress by using one or more scaling functions to generate the time-varying stress experienced by the structure; and (h) outputting the stress information for the structure. In one aspect, the method further comprises repeating steps (d)-(f) for each new frame of the video (or image sequence) to generate the time-varying stress experienced by the structure. In another aspect, the first, second, or subsequent images are captured with a traffic camera that captures images of the structure. In another aspect, the first, second, or subsequent images are captured with a camera that specifically captures images of the structure. In another aspect, the scaling functions for calculating affine transformation are selected from translation, scaling, homothety, similarity transformation, reflection, rotation, shear mapping, and compositions of them, in any combination and sequence. In another aspect, the first, second and any subsequent images are three dimensional images. In another aspect, the first, second and any subsequent images are obtained with a laser or sound. In another aspect, the first, second and any subsequent images are obtained over days, weeks, months or years. In another aspect, multiple structures are concurrently evaluated.

In another embodiment, the present invention includes a non-transitory computer readable medium for detecting stress of a structure by calculating affine transformations of images of the structure, comprising instructions stored thereon, that when executed by a computer having a communications interface, one or more databases and one or more processors communicably coupled to the interface and one or more databases, perform the steps comprising: (a) obtaining a first frame of a sequence of images that includes the structure; (b) identifying portions of the image that are static; (c) obtaining a second and subsequent images that include the structure; (d) segmenting the second and any subsequent images to include the "static" portions that are identified from the first image; (e) computing with a processor the affine transformations between the first and second, and optionally subsequent images, sequence of images; (f) estimating the deformation (i.e. translation and rotation) undergone by the structure; (f) converting this deformation information to estimate the structural stress by using one or more scaling functions; (g) optionally repeating steps (d)-(f) for each new frame of the video (or image sequence) to generate the time-varying stress experienced by the structure; and (h) at least one of storing or displaying the results obtained thereby.

In another embodiment, the present invention includes a computerized method for detecting stress of a structure using affine transformations of images of the structure, comprising: (a) obtaining a first frame of a sequence of images that includes the structure; (b) identifying portions of the image that are static; (c) obtaining a second and subsequent images that include the structure; (d) segmenting the second and any subsequent images to include the "static" portions that are identified from the first image; (e) computing with a processor the affine transformations between the first and second, and optionally subsequent images, sequence of images; (f) estimating the deformation (i.e. translation and rotation) undergone by the structure; (f) converting this deformation information to estimate the structural stress by using one or more scaling functions; (g) optionally repeating steps (d)-(f) for each new frame of the video (or image sequence) to generate the time-varying stress experienced by the structure; and (h) at least one of storing or displaying the results obtained thereby. In one aspect, the first, second, or subsequent images are captured with a traffic camera that captures images of the structure. In another aspect, the first, second, or subsequent images are captured with a camera that specifically captures images of the structure. In another aspect, the scaling functions for calculating affine transformation are selected from translation, scaling, homothety, similarity transformation, reflection, rotation, shear mapping, and compositions of them, in any combination and sequence.

In another embodiment, the present invention includes an apparatus for determining the stress of a structure from one or more images comprising: a camera or other imaging device used to obtain a first, a second, and optionally subsequent image of a structure, wherein the camera or other imaging device are in a fixed position in relation to the structure; and a processor comprising a non-transitory computer readable medium for detecting stress of a structure by calculating affine transformations of images of the structure, comprising instructions stored thereon, that when executed by a computer having a communications interface, one or more databases and one or more processors communicably coupled to the interface and one or more databases, perform the steps comprising: (a) obtaining a first frame of a sequence of images that includes the structure; (b) identifying portions of the image that are static; (c) obtaining a second and subsequent images that include the structure; (d) segmenting the second and any subsequent images to include the "static" portions that are identified from the first image; (e) computing with a processor the affine transformations between the first and second, and optionally subsequent images, sequence of images; (f) estimating the deformation (i.e. translation and rotation) undergone by the structure; (g) converting this deformation information to estimate the structural stress by using one or more scaling functions; (h) optionally repeating steps (d)-(f) for each new frame of the video (or image sequence) to generate the time-varying stress experienced by the structure; and (i) at least one of storing or displaying the results obtained thereby. In another aspect, the method used in the apparatus further comprises repeating steps (d)-(f) for each new frame of the video (or image sequence) to generate the time-varying stress experienced by the structure. In another aspect, the first, second, or subsequent images are captured with a traffic camera that captures images of the structure. In another aspect, the first, second, or subsequent images are captured with a camera that specifically captures images of the structure. In another aspect, the scaling functions for calculating affine transformation are selected from translation, scaling, homothety, similarity transformation, reflection, rotation, shear mapping, and compositions of them, in any combination and sequence. In another aspect, the first, second and any subsequent images are three dimensional images. In another aspect, the first, second and any subsequent images are obtained with a laser or sound. In another aspect, the first, second and any subsequent images are obtained over days, weeks, months or years.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
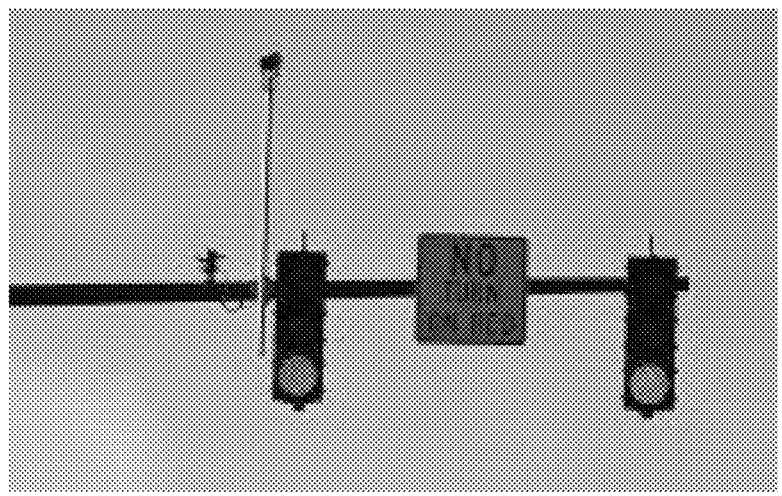
FIG. 1 is an example of an outward facing visual camera mounted on top of the structure under investigation for use with the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Infrastructural health monitoring is a technology that allows the estimation of the structural condition and helps in detecting any structural changes. Detecting the structural impairments and damages is important to ensure the structure's continued functionality and preventing losses due to its potential failures. Structural damage is generally defined as changes to the material and/or geometric properties of a structure, including changes to the boundary conditions and system connectivity that adversely affect the system's performance. Structural Health Monitoring (SHM) is the process of implementing a damage detection and characterization strategy for engineering structures.

Modal characteristics of structures depend on the fast and accurate collection and analysis of the vibration data. Apart of visual inspection, the conventional method for detecting structure impairments includes measurements using structural sensor systems (e.g. installed strain gauges or accelerometers). While contact accelerometers are very accurate and commonly used for modal analysis, their installation can be complex and costly. The remote, wireless and noncontact methods of measurement are being intensely researched for the purposes of structural modal analysis.

The present invention includes an apparatus, method, and computer implemented methods for determining the structural stresses experienced by physical structures, such as traffic signals, using visual images sequences and video. A novelty of the proposed method is that the structural stresses are determined without visual images of elements around the structure and/or without actually imaging the structure under study. The apparatus, method and computer implementation of the present invention will generally involved the use of one or more processors, memory units, display interfaces, displays, sensors, cameras, non-transitory memory, non-volatile memory, storage, and the like.

As used herein, the term "affine transformation" refers to a function between affine spaces which preserves points, straight lines and planes. For example, sets of parallel lines remain parallel after an affine transformation. An affine transformation generally preserve angles between lines or distances between points, and preserve ratios of distances between points lying on a straight line. Examples of affine transformations include, but are not limited to: translation, scaling, homothety, similarity transformation, reflection, rotation, shear mapping, and compositions of them in any combination and sequence.

Detecting the structural impairments of physical structures is important to ensure their continued functionality and prevent losses due to structural failures. Traditional methods for detecting such impairments include: (i) visual inspection by experienced engineers, or (ii) measurements from the structure using sensors such as strain gauges or accelerometers. A more recent technique that has emerged is the use of visual imagery of the structure from a static camera/imaging system.

Figure 2:
FIG. 2 is an example of an image obtained from a representative traffic camera.

The present invention includes a novel visual based-method to detect the impairment of a structure without using direct images/videos of the structure itself. Instead, the method of the present invention relies on inferring the displacements of the structure indirectly using images of the surrounding environment. An apparatus to determine the visual loading consists of a regular off-the-shelf camera that is capable of capturing data at nearly 30 frames per second, or less. The imaging system is deployed on the structure under study, similar to typical traffic camera deployments as shown in FIG. 1. An example of the type of image obtained from a camera deployment such as that shown in FIG. 1, is given in FIG. 2. FIG. 2 clearly contains portions that contain stationary objects (such as road side railing) and other portions that contain moving vehicles. Alternatively, a database of images captured for other purposes, e.g., traffic monitoring, can be used as a source of images that can be used with the present invention.

The method of the present invention generally includes the following major steps:
1. From the first frame of a sequence of images, identify portions of the image in the FOV that are static.
2. From the second and subsequent images, segment those images to include the "static" portions that are identified from the first image.
3. Compute the affine transformations between the sequence of images and estimate the deformation (i.e. translation and rotation) undergone by the structure.
4. Convert this deformation information to estimate the structural stress by using appropriately determined scaling functions.
5. Steps 2-4 are repeated for each new frame of the video (or image sequence) to generate the time-varying stress experienced by the structure.

The present invention provides the stress ranges experienced by the structure relative to the initial condition of the structure (which can be pre-calibrated). An alternate method involves studying the relative differences between subsequent image frames in the video sequences and using this to study structural displacements of each frame. These relative displacement estimates can be used to derive cumulative cycles of deformation and corresponding stress ranges experienced by the structure.

In one example of the method of the present invention, an object/marker of known dimension is placed in the field of view (FOV) of the camera at a predetermined distance from the imager. This information on the marker/object dimension and distance is used to convert the relative motion between images measured in terms of number of pixels to physical distances. Although the initial method proposed uses knowledge of the dimension of a fixed object in the FOV, the method can be easily extended to the scenario when no knowledge of the physical dimensions are known but are estimated based on analysis of other objects in the scene.

The method of the present invention can also be used to simultaneously detect the displacement of the structure on which the camera is mounted and the displacement of other structures in the field of view of the imaging system, using a single sequence of images.

As another extension, the method of the present invention can also combine image/video data from multiple cameras to improve the accuracy of the estimated displacements. As such, the present invention allows calculation of the ranges of stress experienced by the structure relatively to its initial (predefined, or 'static') condition. Moreover, the method of the present invention uses a single sequence of images obtained from the imaging system (e.g. off-the-shelf video camera) to simultaneously detect the: displacement (stress range) of the structure having a mounted imaging system; and/or displacement (stress range) of surrounding structures within the field of view of the imaging system. Alternatively, a combination of image/video data from multiple cameras can be used to improve the accuracy of the estimated displacements/structural stresses.

Figure 3:
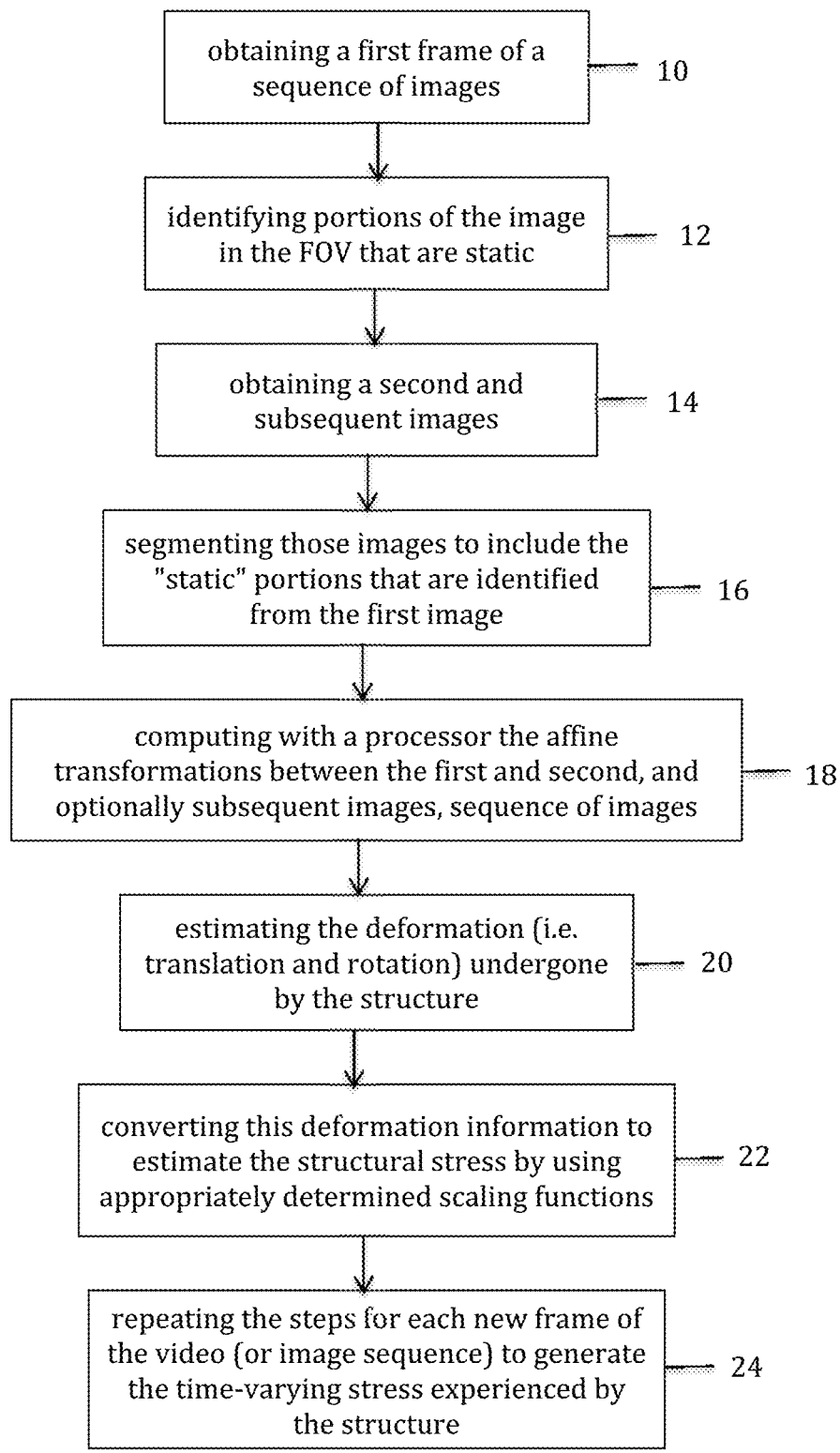
FIG. 3 is a flowchart that describes the basic operation of the present invention.

FIG. 3 is a flow chart that shows the basic steps of the present invention for measuring stress on a structure. In step 10, a camera or other image capture device (or a database of images) is used to obtain a first frame of a sequence of images. In step 12, the process identifies the portions of the image in the FOV that are static. In step 14, the camera or other image capture device (or a database of images) is used to obtain a second and subsequent images. In step 16, the first, second and any subsequent images are segmented to include the "static" portions that are identified from the first image. In step 18, a processor is used to determine affine transformations between the first and second (and optionally subsequent images), into a sequence of images. In step 20, the sequence of images is used for estimating the deformation (i.e. translation and rotation) undergone by the structure, which his indicative of structural stress. In step 22, the deformation information is converted to estimate the structural stress by using one or more scaling functions. In step 24, the method repeats the steps for each new frame of the video (or image sequence) to generate the time-varying stress experienced by the structure.

The closest work to the present invention is the recent work by Bartilson [1]. A critical difference between the present invention and the method of Bartilson is that the camera is placed on a separate, stable and isolated platform from the structure being studied. The work in Bartilson also fails to discuss the simultaneous monitoring of multiple structures. The work in Chen [2] also uses imaging technology to study the behavioral properties of the structure but it uses very high speed video cameras capable of several hundred to a thousand frames per second to record data and process it to obtain the modes of the light pole structure. Another related work is the patent application of Spencer [3], which discusses a monitoring system for structures subject to loading such as wind loading.

The patent briefly mentions that visual data from a camera can be used to estimate the loading but no such specific method is discussed.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains.

All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

1. Target-less computer vision for traffic signal structure vibration studies, Daniel T. Bartilson, Kyle T. Wieghaus, Stefan Hurlebaus, Mechanical Systems and Signal Processing 2015.
2. Structural Modal Identification through High Speed Camera Video: Motion Magnification, Justin G. Chen, Neal Wadhwa, Young-Jin Cha, Frédo Durand, William T. Freeman, Oral Buyukorturk, Proceedings of the 32nd International Modal Analysis Conference (2014).
3. PCT Patent Application Publ. WO 2014/075140 A1, Monitoring system, Inventor: Nathan John Spencer.

What is claimed is:

1. A method for determining time-varying stress experienced by a structure comprising:
   (a) obtaining a first image that includes a first frame of a sequence of images captured by one or more devices or cameras on the structure;
   (b) identifying static portions of the first image;
   (c) obtaining a second and subsequent images captured by the one or more devices or cameras on the structure;
   (d) segmenting the second and any subsequent images to include static portions that are identified from the first image, the second image and subsequent images;
   (e) computing with a processor affine transformations between the first and second images, and optionally subsequent images or the sequence of images;
   (f) estimating a deformation undergone by the structure from the affine transformations computed for the first, second and optionally subsequent images of a surrounding or static portions of the first image;
   (g) converting the deformation to estimate structural stress by using one or more scaling functions to generate time-varying stress results experienced by the structure; and
   (h) outputting the time-varying stress results for the structure.

2. The method of claim 1, further comprising repeating steps (d)-(f) for each new frame of a video or a video image of sequences to generate the time-varying stress results experienced by the structure.

3. The method of claim 1, wherein the first, second, or subsequent images are captured with a traffic camera that captures images of the structure.

4. The method of claim 1, wherein the first, second, or subsequent images are captured with a camera that specifically captures images of the structure.

5. The method of claim 1, wherein the scaling functions for calculating affine transformation are selected from translation, scaling, homothety, similarity transformation, reflection, rotation, shear mapping, and compositions of the first and second images, in any combination and sequence.

6. The method of claim 1, wherein the first, second and any subsequent images are three dimensional images.

7. The method of claim 1, wherein the first, second and any subsequent images are obtained with a laser or sound.

8. The method of claim 1, wherein the first, second and any subsequent images are obtained over days, weeks, months or years.

9. The method of claim 1, wherein multiple structures are concurrently evaluated.

10. A non-transitory computer readable medium for detecting stress of a structure by calculating affine transformations of images of the structure, comprising instructions stored thereon, that when executed by a computer having a communications interface, one or more databases and one or more processors communicably coupled to the interface and one or more databases, perform the steps comprising:
 (a) obtaining a first image that includes a first frame of a sequence of images captured by one or more devices or cameras on the structure;
 (b) identifying static portions of a first image;
 (c) obtaining a second and subsequent images captured by the one or more devices or cameras on the structure;
 (d) segmenting the second and any subsequent images to include static portions that are identified from a first image, the second image and subsequent images;
 (e) computing with a processor affine transformations between the first and second images, and optionally subsequent images or the sequence of images;
 (f) estimating a deformation undergone by the structure from the affine transformations computed for the first, second and optionally subsequent images of a surrounding or static portions of the first image;
 (g) converting the estimated deformation to estimate structural stress by using one or more scaling functions;
 (h) optionally repeating steps (d)-(f) for each new frame of a video (or image sequence) captured by the one or more devices or cameras on the structure to generate time-varying stress results experienced by the structure; and
 (i) at least one of storing or displaying time-varying stress results obtained thereby.

11. A computerized method for detecting stress of a structure using affine transformations of images of the structure, comprising:
 (a) obtaining a first image that includes a first frame of a sequence of images captured by one or more devices or cameras on the structure;
 (b) identifying static portions of the first image;
 (c) obtaining a second and subsequent images captured by the one or more devices or cameras on the structure;
 (d) segmenting the second and any subsequent images to include static portions that are identified from the first image, the second image and subsequent images;
 (e) computing with a processor affine transformations between the first and second, and optionally subsequent images, the sequence of images;
 (f) estimating a deformation, including a translocation and rotation, undergone by the structure based on the affine transformations computed for the first, second and optionally subsequent images of a surrounding or static portions of the first image;
 (g) converting the estimated deformation to estimate structural stress by using one or more scaling functions;
 (h) optionally repeating steps (d)-(f) for each new frame of a video (or image sequence) to generate time-varying stress results experienced by the structure; and
 (i) at least one of storing or displaying time-varying stress results obtained thereby.

12. The method of claim 11, wherein the sequence of images are captured with a traffic camera that captures images of the structure.

13. The method of claim 11, wherein the sequence of images are captured with a camera that specifically captures images of the structure.

14. The method of claim 11, wherein the scaling functions for calculating affine transformation are selected from translation, scaling, homothety, similarity transformation, reflection, rotation, shear mapping, and compositions of the first and second images, in any combination and sequence.

15. An apparatus for determining the stress of a structure from one or more images comprising:
 one or more cameras or other imaging device on the structure used to obtain a first, a second, and optionally subsequent images from the structure, wherein the camera or other imaging device are in a fixed position on the structure; and
 a processor comprising a non-transitory computer readable medium for detecting stress of a structure by calculating affine transformations of images of the structure, comprising instructions stored thereon, that when executed by a computer having a communications interface, one or more databases and one or more processors communicably coupled to the interface and one or more databases, perform the steps comprising:
 (a) obtaining a first image that includes a first frame of a sequence of images captured by the one or more cameras or other imaging devices on the structure;
 (b) identifying static portions of the first, second, and optionally subsequent images;
 (c) obtaining a second and subsequent images from one or more cameras or other imaging device on the structure;
 (d) segmenting the second and any subsequent images to include static portions that are identified from a first image, the second image and subsequent images;
 (e) computing with a processor the affine transformations between the first and second, and optionally subsequent images, or the sequence of images;
 (f) estimating a deformation undergone by the structure from the affine transformations computed for the first, second and optionally subsequent images of a surrounding or static portions of the first image;
 (g) converting the estimated deformation to estimate structural stress by using one or more scaling functions;
 (h) optionally repeating steps (d)-(f) for each new frame of a video (or image sequence) to generate time-varying stress results experienced by the structure; and
 (i) at least one of storing or displaying the time-varying stress results obtained thereby.

16. The apparatus of claim 15, further comprising repeating steps (d)-(f) for each new frame of the video (or image sequence) to generate the time-varying stress results experienced by the structure.

17. The apparatus of claim 15, wherein the first, second, or subsequent images are captured with a traffic camera that captures images of the structure.

18. The apparatus of claim 15, wherein the first, second, or subsequent images are captured with a camera that specifically captures images of the structure.

19. The apparatus of claim 15, wherein the scaling functions for calculating affine transformation are selected from translation, scaling, homothety, similarity transformation, reflection, rotation, shear mapping, and compositions the first and second images, in any combination and sequence.

20. The apparatus of claim 15, wherein the first, second and any subsequent images are three dimensional images.

21. The apparatus of claim 15, wherein the first, second and any subsequent images are obtained with a laser or sound.

22. The apparatus of claim 15, wherein the first, second and any subsequent images are obtained over days, weeks, months or years.

* * * * *